United States Patent
Peng

(10) Patent No.: US 12,067,102 B2
(45) Date of Patent: Aug. 20, 2024

(54) SECURITY VERIFICATION METHOD AND RELEVANT DEVICE

(71) Applicant: Tencent Technology (Shenzhen) Company Limited, Guangdong (CN)

(72) Inventor: Dandan Peng, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 18/130,007

(22) Filed: Apr. 3, 2023

(65) Prior Publication Data

US 2023/0237141 A1 Jul. 27, 2023

Related U.S. Application Data

(63) Continuation of application No. 16/673,455, filed on Nov. 4, 2019, now Pat. No. 11,645,379, which is a (Continued)

(30) Foreign Application Priority Data

Nov. 14, 2017 (CN) .......................... 201711123509.5

(51) Int. Cl.
*G06F 21/36* (2013.01)
*G06F 3/0484* (2022.01)
(Continued)

(52) U.S. Cl.
CPC .......... *G06F 21/36* (2013.01); *G06F 3/04847* (2013.01); *G06F 16/9538* (2019.01); *G06N 20/00* (2019.01); *G06F 2221/2133* (2013.01)

(58) Field of Classification Search
CPC .. G06F 21/36; G06F 16/9538; G06F 3/04847; G06F 2221/2133; G06N 20/00
See application file for complete search history.

(56) References Cited

U.S. PATENT DOCUMENTS 9,230,355 B1 1/2016 Ahuja
9,495,532 B1 11/2016 Zhurkin
(Continued)

FOREIGN PATENT DOCUMENTS

CN 101540823 A 9/2009
CN 102768754 A 11/2012
(Continued)

OTHER PUBLICATIONS

International Search Report issued Jan. 16, 2019 in International Application No. PCT/CN2018/112625, with English translation.
(Continued)

*Primary Examiner* — Stephen S Hong
*Assistant Examiner* — Darrin Hope
(74) *Attorney, Agent, or Firm* — Crowell & Moring LLP

(57) ABSTRACT

The present disclosure provides a security verification method and a relevant device, to increase the difficulty of cracking. The method includes: receiving, from a verification requester, a request for pulling a sliding verification code; acquiring the sliding verification code which includes a slider and a second endpoint image obtained by performing filter processing on a first endpoint image; and returning the sliding verification code to the verification requester. The first endpoint image and the slider are generated from the same original image, and the slider and the second endpoint image are returned to the verification requester finally. The second endpoint image is obtained by performing image processing on the first endpoint image, and after the image processing, in an area outside the slider placement area, pixel values of pixels in the second endpoint image are different from pixel values of corresponding pixels in the original image.

20 Claims, 13 Drawing Sheets

Related U.S. Application Data continuation of application No. PCT/CN2018/112625, filed on Oct. 30, 2018.

(51) Int. Cl.
*G06F 3/04847* (2022.01)
*G06F 16/9538* (2019.01)
*G06N 20/00* (2019.01)

(56) References Cited

U.S. PATENT DOCUMENTS

| | | | |
|---|---|---|---|
| 9,652,601 | B2 | 5/2017 | Johansson et al. |
| 10,050,787 | B1 * | 8/2018 | Johansson ............ H04L 9/0866 |
| 2012/0323700 | A1 | 12/2012 | Aleksandrovich |
| 2013/0179958 | A1 | 7/2013 | Fujiwara |
| 2014/0047527 | A1 | 2/2014 | Ngo |
| 2014/0250538 | A1 | 9/2014 | Rapaport |
| 2015/0143495 | A1 | 5/2015 | Okada |
| 2015/0205500 | A1 | 7/2015 | Zacharias |
| 2017/0256038 | A1 | 9/2017 | Lee |

FOREIGN PATENT DOCUMENTS

| | | |
|---|---|---|
| CN | 104200150 A | 12/2014 |
| CN | 104732135 A | 6/2015 |
| CN | 105282121 A | 1/2016 |
| CN | 105306208 A | 2/2016 |
| CN | 106295264 A | 1/2017 |
| CN | 107181733 A | 9/2017 |
| CN | 109782989 A | 5/2019 |
| WO | WO 2017/076186 A1 | 5/2017 |

OTHER PUBLICATIONS

Search Report of corresponding Chinese application 2017111235095 on Nov. 14, 2017, 10 pages.
Office Action issued on corresponding Chinese application 201711123509.5, dated May 7, 2021, 8 pages.
Concise summary of office action dated May 7, 2021 of CN201711123509.5.

* cited by examiner

SECURITY VERIFICATION METHOD AND RELEVANT DEVICE

RELATED APPLICATION

This application is a continuation application of U.S. application Ser. No. 16/673,455, filed on Nov. 4, 2019, which is a continuation application of PCT Patent Application No. PCT/CN2018/112625, filed on Oct. 30, 2018, which claims priority to Chinese Patent Application No. 201711123509.5, entitled "SECURITY VERIFICATION METHOD AND RELEVANT DEVICE" filed on Nov. 14, 2017, both of which are incorporated herein by reference in their entireties.

FIELD OF THE TECHNOLOGY

The present disclosure relates to the field of communications technologies, and in particular, to security verification.

BACKGROUND OF THE DISCLOSURE

Completely Automated Public Turing test to tell Computers and Humans Apart (CAPTCHA), commonly referred to as a verification code, is a public completely automated technology for determining whether the user is a computer or human. CAPTCHA generates and grades a test that humans can pass but computers cannot, to determine whether an operation is performed by a human or computer.

A sliding verification code is a verification code including an original image, a slider, and an endpoint image. Both the slider and the endpoint image are generated from the original image.

It is assumed that an original image is shown in FIG. 1a, and a slider 101 and an endpoint image 102 generated from the original image are shown in FIG. 1b. The endpoint image 102 includes a slider placement area 103, and the center point of the slider placement area 103 is a slider endpoint 104. During verification, the slider placement area 103 is dimmed. As shown in FIG. 1c, a user needs to drag the slider 101 to the slider placement area 103 (in FIG. 1c, a mouse is denoted by an arrow 105) to cause the center point of the slider 101 to coincide with the slider endpoint 104, in order to pass the verification.

The slider endpoint 104 is easily cracked by pixel-by-pixel subtraction between the original image and the endpoint image 102. This is because that during verification, except for the dimmed slider placement area 103, pixel values of pixels in other areas in the endpoint image 102 are the same as those of corresponding pixels in the original image. For example, after pixel-by-pixel subtraction is performed on the original image and the endpoint image 102, a subtraction result shown in FIG. 1d is obtained, that is, pixel values in all areas except the slider placement area are zero (in FIG. 1d, a cross is used to represent that a pixel value of a pixel is not zero).

Therefore, how to increase the difficulty of cracking a sliding validation code has become a hot research topic.

SUMMARY

In view of this, embodiments of the present disclosure provide a security verification method and a relevant device, to increase the difficulty of cracking a sliding verification code.

To address the above issues, the embodiments of the present disclosure provide the following technical solutions.

According to a first aspect, the embodiments of the present disclosure provide a security verification method performed by a server. The method may include:
receiving, from a client, a request for security verification;
acquiring a slider and a second endpoint image, the second endpoint image being obtained by performing image processing on a first endpoint image, both the first endpoint image and the slider being generated from a same original image; and
sending the slider and the second endpoint image to the client for the client to display the slider and the second endpoint image for the security verification, wherein neither the original image nor a graphical representation of the original image is displayed on the client for the security verification.

According to a second aspect, the embodiments of the present disclosure provide a security verification method performed by a client. The method may include:
sending a request for security verification to a server;
receiving a slider and a second endpoint image, the second endpoint image being obtained by performing image processing on a first endpoint image, both the first endpoint image and the slider being generated from a same original image; and
displaying the slider and the second endpoint image for the security verification, wherein neither the original image nor a graphical representation of the original image is displayed for the security verification.

According to a third aspect, the embodiments of the present disclosure provide a security verification device, including a memory operable to store program code and a processor. The processor is operable to read the program code and perform a plurality of operations including:
receiving, from a client, a request for security verification;
acquiring a slider and a second endpoint image, the second endpoint image being obtained by performing image processing on a first endpoint image, both the first endpoint image and the slider being generated from a same original image; and
sending the slider and the second endpoint image to the client for the client to display the slider and the second endpoint image for the security verification, wherein neither the original image nor a graphical representation of the original image is displayed on the client for the security verification.

According to a fourth aspect, the embodiments of the present disclosure provide a security verification system, including a front-end server and a verification code generation server, the front-end server being configured to: receive, from a verification requester, a request for pulling a sliding verification code, acquire a sliding verification code generated by the verification code generation server, and return the sliding verification code to the verification requester, the sliding verification code at least including a slider and a second endpoint image obtained by performing image processing on a first endpoint image, both the first endpoint image and the slider being generated from the same original image, an edge of the slider matching with an edge of a slider placement area in the first endpoint image, and an edge of the slider matching with an edge of a slider placement area in the second endpoint image; and the verification code generation server being configured to generate the sliding verification code.

In the sliding verification code including a slider and a second endpoint image according to the embodiments of the present disclosure, the first endpoint image and the slider are generated from the same original image, and the slider and the second endpoint image are returned to the verification requester finally. The second endpoint image is obtained by performing image processing on the first endpoint image, and after the image processing, in an area outside the slider placement area, pixel values of pixels in the second endpoint image are different from pixel values of corresponding pixels in the original image. In this way, even if pixel-by-pixel subtraction is performed between the original image and the second endpoint image, not all pixel values of other areas other than the slider placement area are zero, thereby increasing the difficulty of cracking the sliding verification code and improving security.

DESCRIPTION OF EMBODIMENTS

The embodiments of the present disclosure provide a security verification method and a relevant device (a security verification device and a security verification system).

The security verification method and the relevant device may be applied to a scenario where a user uses a client to interact with a server to complete verification.

Figure 1A:
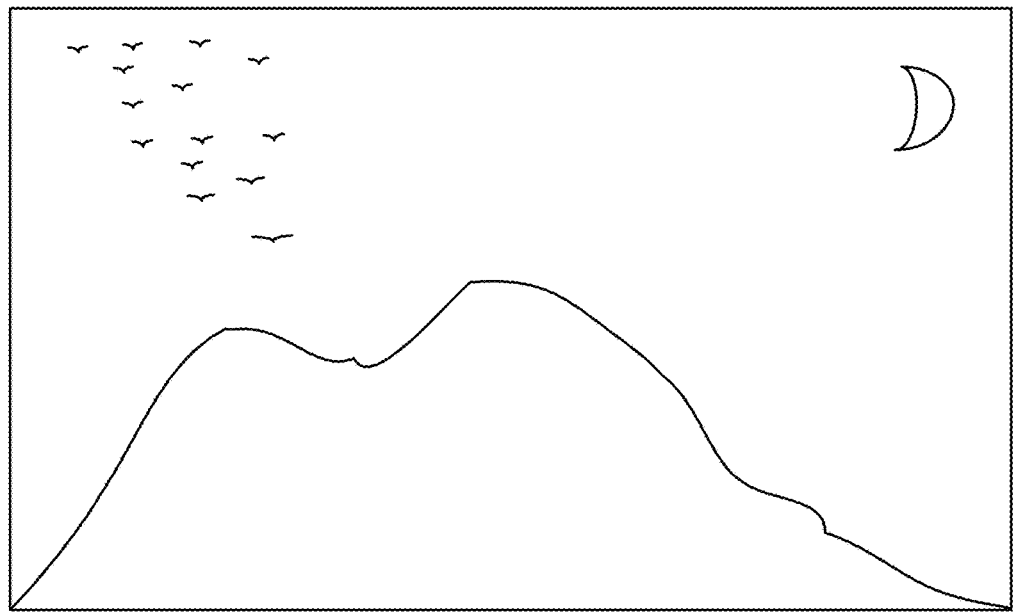
FIG. 1a is a schematic diagram of an original image.
Figure 1B:
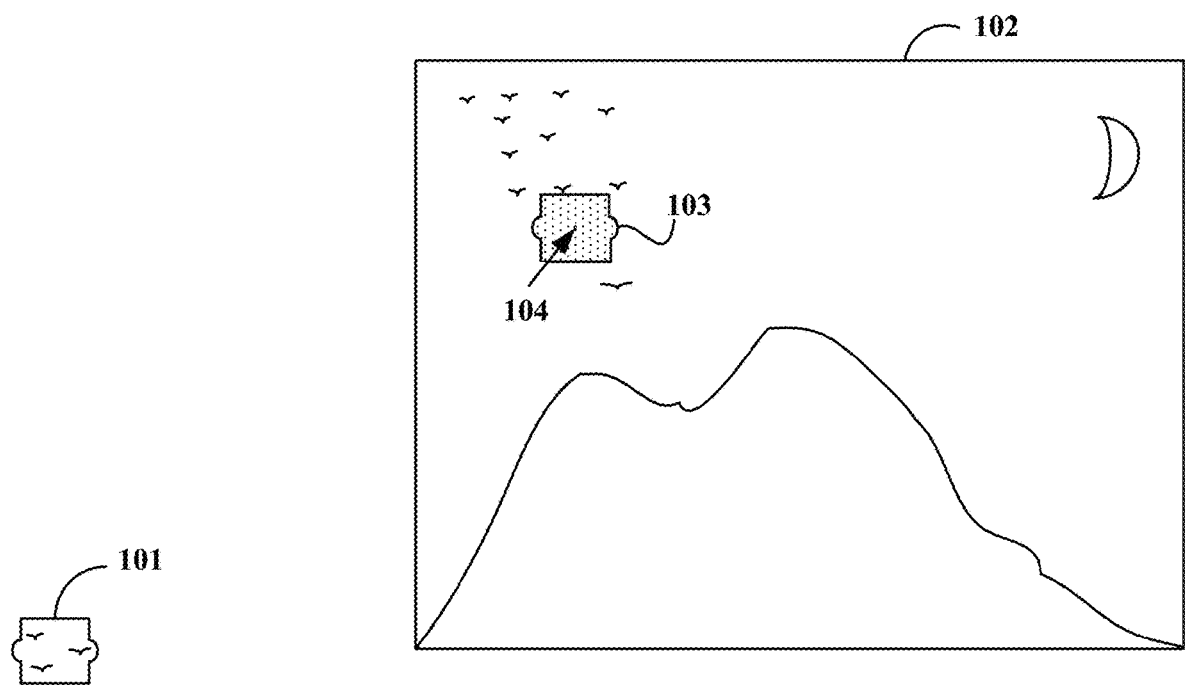
FIG. 1b is a schematic diagram of a slider and an endpoint image.
Figure 1C:
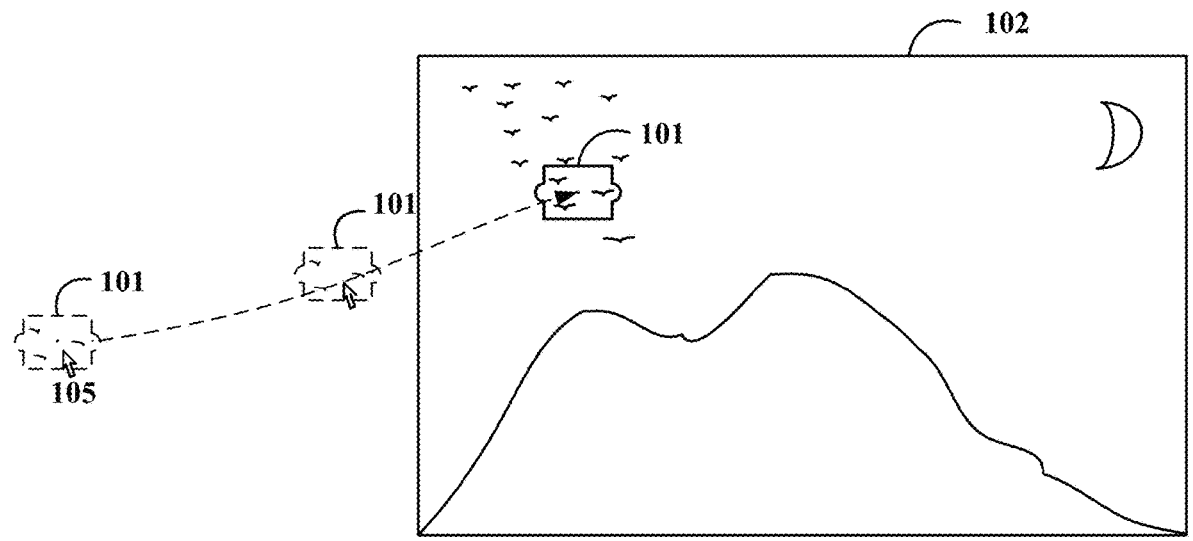
FIG. 1c is a schematic diagram of a dragging process.
Figure 1D:
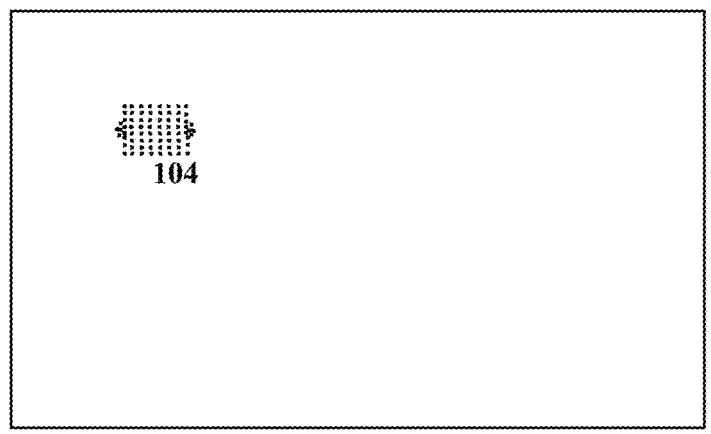
FIG. 1d is a schematic diagram of a result of subtraction between an original image and an endpoint image in an existing verification method.
Figure 2:
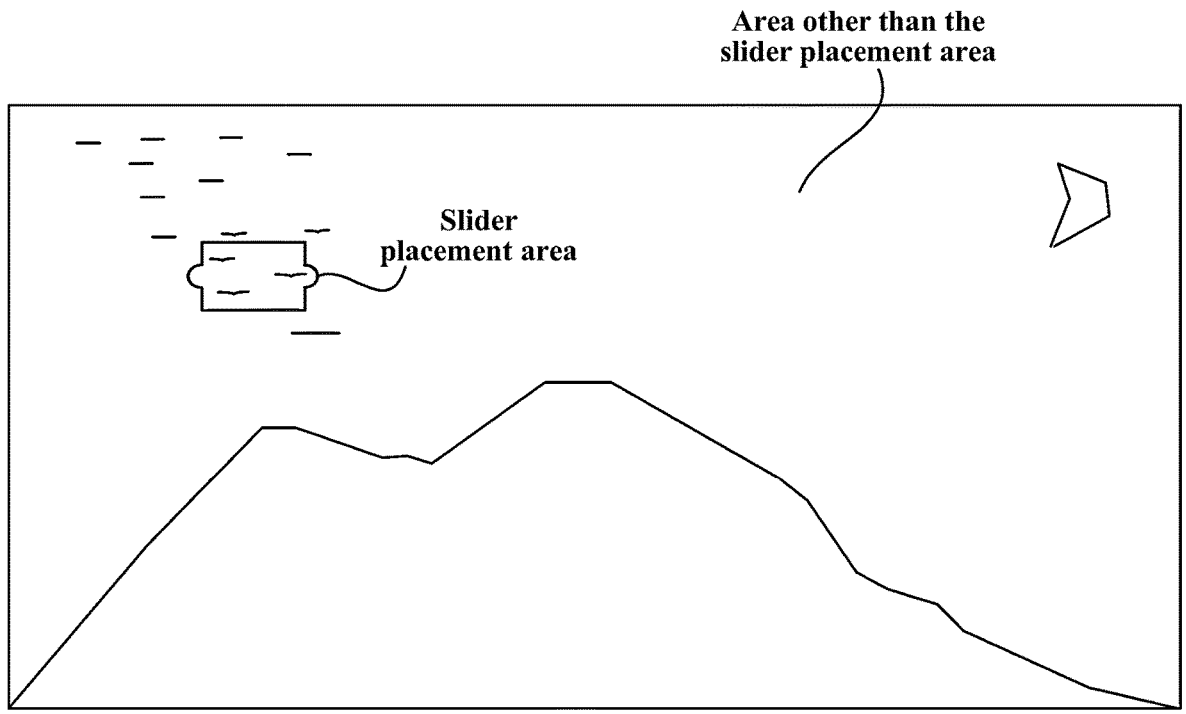
FIG. 2 is a schematic diagram of a second endpoint image according to an embodiment of the present disclosure.

The core concept of the embodiments of the present disclosure is that: taking a slider 101 and an endpoint image 102 shown in FIG. 1b as an example, the slider 101 and the endpoint image 102 are not directly returned to a verification requester (that is, the client); instead, image processing (certainly, in the embodiments of the present disclosure, a slider placement area 103 in the endpoint image 102 may be dimmed or not) is performed on the endpoint image 102 which serves as an intermediate image (also referred to as a first endpoint image), to obtain a second endpoint image (for example, as shown in FIG. 2).

A dimming effect may be achieved by subtracting a value from RGB channels of a slider placement area. The brightness is determined by the value, and the value can be adjusted.

The second endpoint image also includes the slider placement area. After the image processing, in an area other than the slider placement area, pixel values of pixels of the second endpoint image may be different from pixel values of corresponding pixels of an original image. In this way, even if pixel-by-pixel subtraction is performed between the original image and the second endpoint image, not all pixel values of other parts other than the slider placement area are zero after the subtraction, thereby increasing the difficulty of cracking the sliding verification code and improving security.

After the core concept is introduced, the relevant device according to the embodiments of the present disclosure is described below.

A security verification device may be deployed on each of a client (a terminal) and a server to complete interaction and verification. For purpose of distinguishing, the security verification device of the client may be referred to as a first security verification device, and the security verification device of the server may be referred to as a second security verification device.

The first security verification device may be applied to a terminal (a client) such as a desktop computer, a mobile terminal (such as, a smartphone), an iPad, and the like. More specifically, the first security verification device may be a browser installed in the terminal.

On the side of the server, the second security verification device may be applied to the server in a software or hardware form.

In an actual scenario, on the side of the server, a plurality of servers having different functions may collaborate to provide a verification service. Therefore, the security verification system described above may include the plurality of servers having different functions. Certainly, the client may also be considered as a constituent of the security verification system.

Figure 3A:
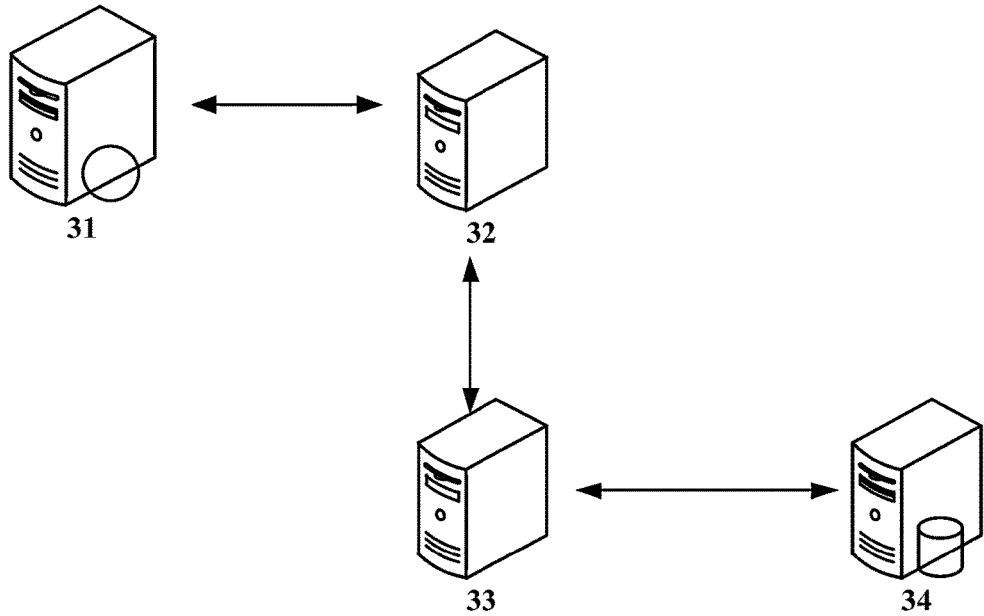
FIG. 3a is an exemplary structural diagram of a security verification system according to an embodiment of the present disclosure.

FIG. 3a shows an exemplary architecture of the security verification system, including a web server 31, a verification server 32, a verification code generation server 33, and an image storage server 34.

The web server 31 is a front-end server responsible for communicating with a client browser, and the verification server 32, the verification code generation server 33 and the image storage server 34 are back-end servers. The verification server 32 may provide a verification service, the verification code generation server 33 may provide a verification code generation service, and the image storage server 34 may be configured to store an image (an original image) for generating a verification code.

Certainly, functions of a plurality of servers may be implemented by one server. For example, the verification code generation server 33 and the image storage server 34 may be integrated into one server, or the functions of the verification server 32, the verification code generation server 33, and the image storage server 34 may be integrated into one server.

Internal structures of the devices are described below.

Figure 3B:
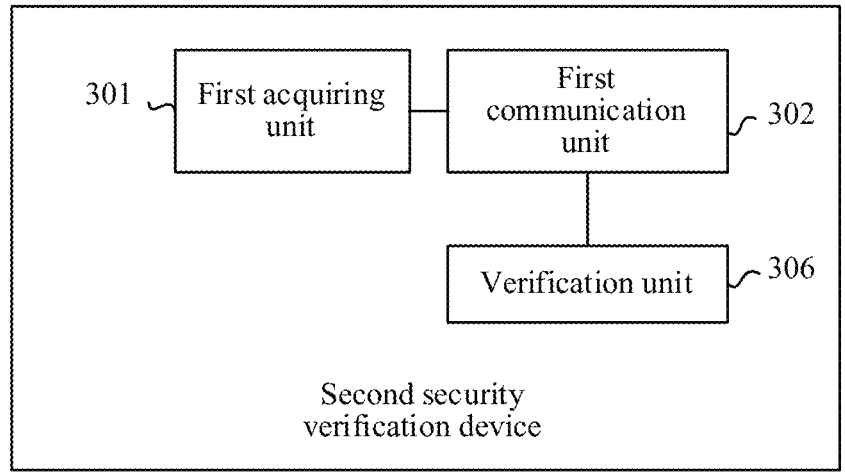
FIG. 3b to FIG. 3d are exemplary structural diagrams of a security verification device according to an embodiment of the present disclosure.

An exemplary structure of the second security verification device is shown in FIG. 3b, including a first acquiring unit 301 and a first communication unit 302. The first acquiring unit 301 may be configured to acquire a sliding verification code (at least including a slider and a second endpoint image), and the first communication unit 302 is configured to return the sliding verification code to a verification requester.

Figure 3C:
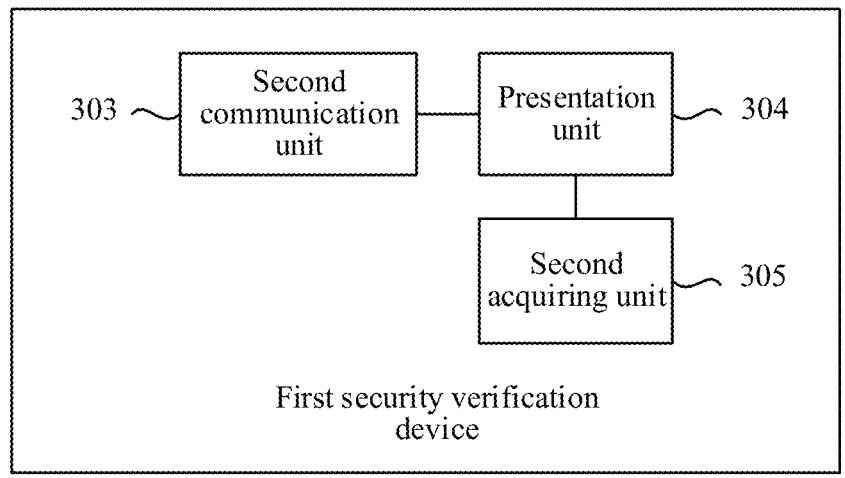

An exemplary structure of the first security verification device is shown in FIG. 3c, including:

a second communication unit 303, configured to receive the sliding verification code returned by the first communication unit 302; and a presentation unit 304, configured to present the sliding verification code.

The presentation unit 304 may specifically be a display screen, and the first communication unit 302 and the second communication unit 303 may specifically be communications interfaces.

Still referring to FIG. 3c, in another embodiment of the present disclosure, the first security verification device may further include a second acquiring unit 305 configured to acquire verification information after the presentation unit 304 presents the sliding verification code; and the second communication unit 303 returns the verification information to the second security verification device.

Correspondingly, referring to FIG. 3b, the second security verification device may further include a verification unit 306 configured to perform verification based on the verification information returned by the verification requester.

Figure 3D:
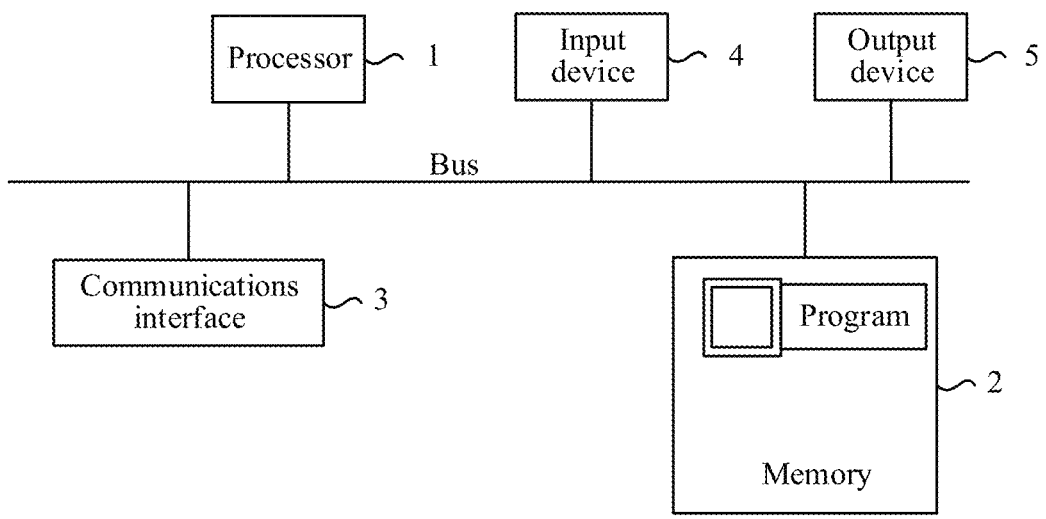

FIG. 3d is another possible schematic structural diagram of the second security verification device according to the embodiment, including:

a bus, a processor 1, a memory 2, a communications interface 3, an input device 4, and an output device 5, the processor 1, the memory 2, the communications interface 3, the input device 4 and the output device 5 being interconnected through the bus.

The bus may include a path for transmitting information between components of a computer system.

The processor 1 may be a general-purpose processor such as a general-purpose central processing unit (CPU), a network processor (NP), a microprocessor and the like, or may be an application-specific integrated circuit (ASIC), or one or more integrated circuits configured to control the execution of a program in the solution of the present disclosure, or may be a digital signal processor (DSP), a field programmable gate array (FPGA) or other programmable logic device, discrete gate or transistor logic device, or discrete hardware component.

The memory 2 stores a program or script for executing a technical solution of the present disclosure, and may further store an operating system and other key services. Specifically, the program may include program code, and the program code includes a computer operation instruction. The script is usually stored in text (such as ASCII), and is parsed or compiled only when called.

More specifically, the memory 2 may include a read-only memory (ROM), other types of static storage devices capable of storing static information and instructions, a random access memory (RAM), other types of dynamic storage devices capable of storing information and instructions, a magnetic disk storage, a flash, and the like.

The input device 4 may include a device configured to receive data and information inputted by a user, such as a keyboard, a mouse, a camera, a voice input device, a touchscreen, and the like.

The output device 5 may include a device configured to output information to the user, such as a display screen, a speaker, and the like.

The communications interface 3 may include a device using any type of transceiver to communicate with another device or a communication network, such as an Ethernet, a radio access network (RAN), a wireless local area network (WLAN), and the like.

It may be understood that FIG. 3d only shows a simplified design of a server/intelligent terminal. In actual applications, the second security verification device may include any number of transmitters, receivers, processors, controllers, memories, communications interfaces, and the like, and all servers/intelligent terminals that can implement the embodiments of the present disclosure fall within the protection scope of the embodiments of the present disclosure.

The processor 1 may implement a verification method provided in the following embodiments by executing the program stored in the memory 2 and calling another device.

In addition, functions of units of the second security verification device may be implemented by the processor 1 executing the program stored in the memory 2 and calling another device.

For the first security verification device mentioned above, the servers may use a computer architecture similar to the second security verification device.

The embodiments of the present disclosure are described in further detail below based on common aspects of the foregoing embodiments of the present disclosure.

Figure 4:
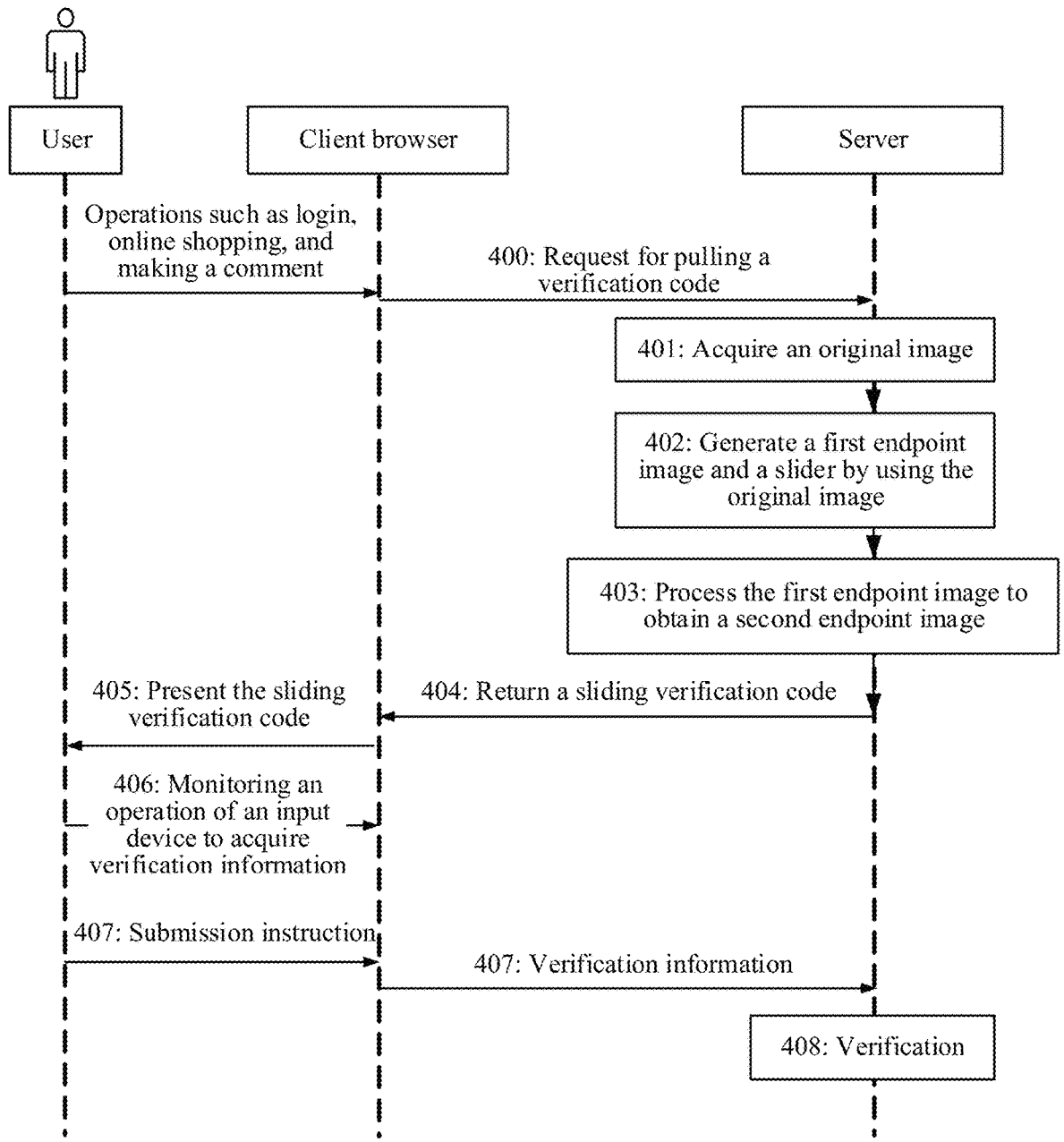
FIG. 4 and FIG. 6 are exemplary flowcharts of a security verification method according to an embodiment of the present disclosure.

FIG. 4 shows an exemplary interaction process of generating a sliding verification code and performing verification, which may at least include the following steps:

Part 400: A client/terminal (a browser) sends a request for pulling a verification code to a server.

The client/terminal (the browser) is a verification requester.

This embodiment may be applied to any scenario requiring verification of the verification code, such as user login, online shopping (such as ticket purchasing), making a comment, and the like.

In different scenarios, conditions of triggering the sending of a request for pulling a verification code (briefly referred to as pulling request) may be different. For example, in a login scenario, the pulling request may be sent when the user clicks on a login button of the client. For example, in a ticket purchasing scenario, the pulling request may be sent when the user clicks on a ticket purchasing button.

Part 401: The server acquires an original image used for generating a sliding verification code.

The original image may be acquired at random or according to a preset rule.

For example, the original image is as shown in FIG. 1a.

Part 402: The server generates a first endpoint image and a slider by using the original image.

Figure 5A:
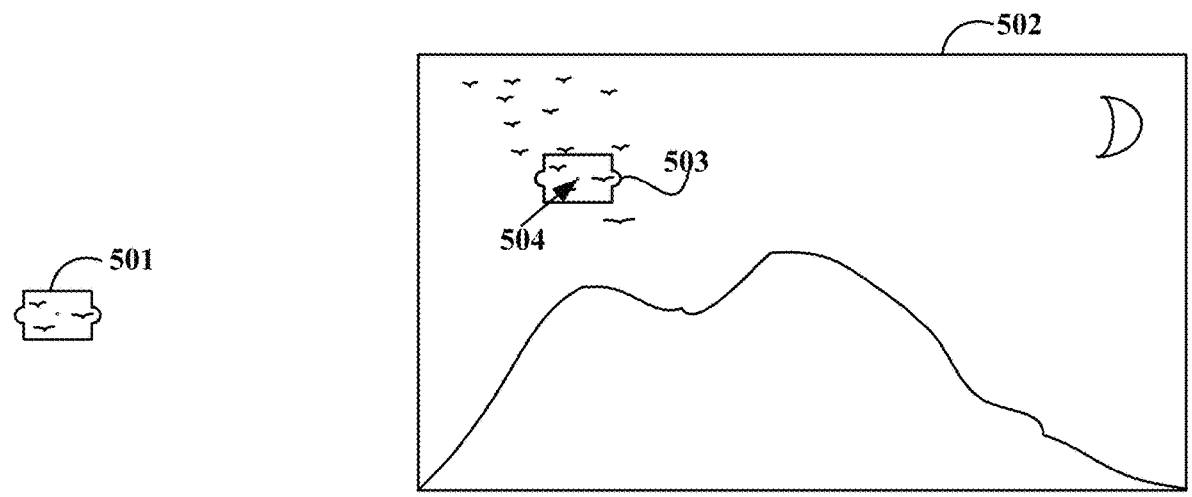
FIG. 5a and FIG. 5b are schematic diagrams of a slider and a first endpoint image according to an embodiment of the present disclosure.
Figure 5B:
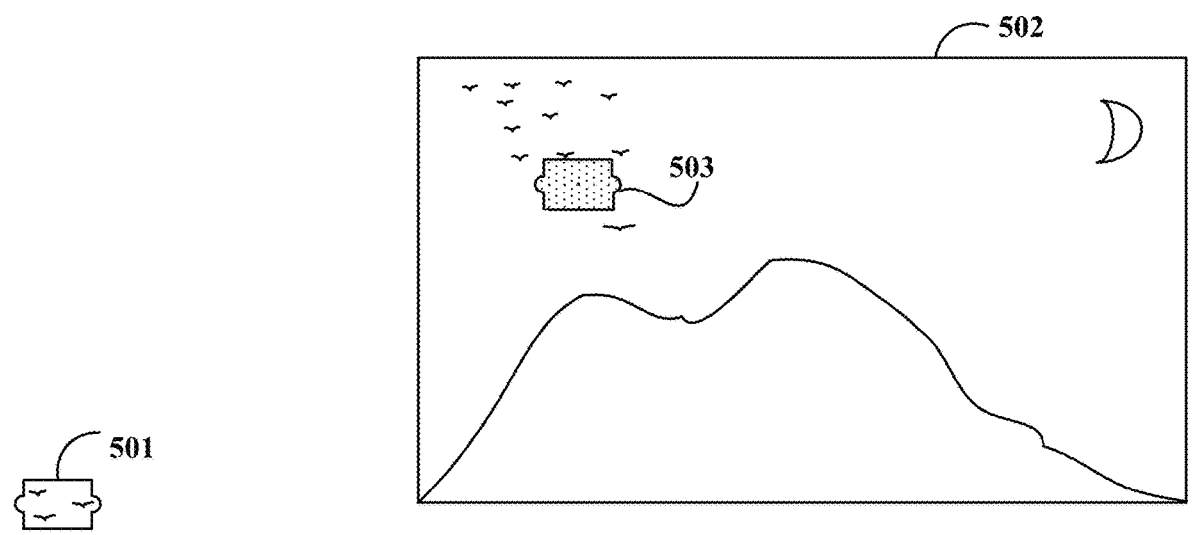

Referring to FIG. 5a and FIG. 5b, an edge of a slider 501 matches with an edge of a slider placement area 503 in the first endpoint image 502, and the slider placement area 503 may be dimmed (as shown in FIG. 5b) or not (as shown in FIG. 5a).

Certainly, a slider endpoint is at the location of a center point 504 (referring to FIG. 5a) of the slider placement area 503.

Part 403: The server performs image processing on the first endpoint image to obtain a second endpoint image.

The second endpoint image and the slider will be presented to the user through the client finally, and the first endpoint image will not be presented to the user.

The second endpoint image also has a slider placement area, and an edge of the slider also matches with an edge of the slider placement area in the second endpoint image.

After generating the second endpoint image, the server records the location of the center point of the slider placement area in the second endpoint image, that is, the slider endpoint (also referred to as a first endpoint location), for subsequent verification.

In an example, a coordinate of the center point in a coordinate system of the second endpoint image may be used as the slider endpoint. In this case, no matter where the image is on the screen, a coordinate of an edge vertex on the image does not change.

An objective of the image processing includes: at least changing the distribution of pixel values of the second endpoint image, especially, the distribution of pixel values outside the slider placement area. In this way, even if pixel-by-pixel subtraction is performed between the original image and the second endpoint image, not all pixel values of other parts are zero after the subtraction, thereby increasing the difficulty of cracking the sliding verification code and improving security.

Pixel values of a color image refer to corresponding values of channel matrixes of RGB channels in the color image.

The objective may be achieved by using a plurality of image processing manners, for example, adding random noise or performing filter processing on the first endpoint image. In addition, a horizontal flip may be performed, or resolution may be changed.

Figure 5C:
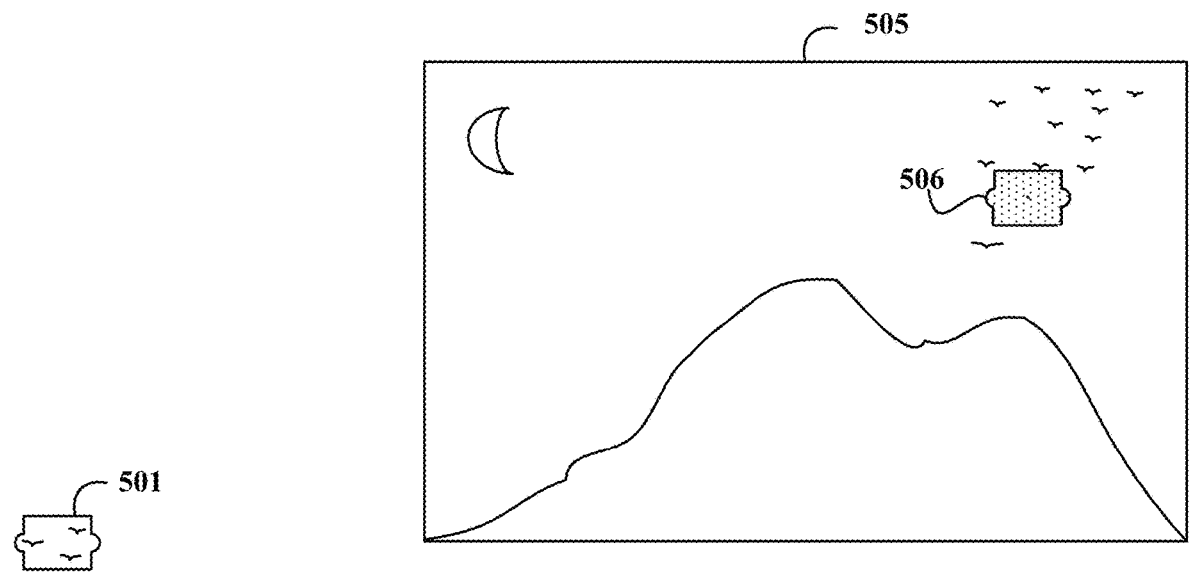
FIG. 5c is a schematic diagram of a second endpoint image according to an embodiment of the present disclosure.

Referring to FIG. 5c, a horizontal flip is used as an example. Compared with FIG. 5b, a second endpoint image 505 in FIG. 5c is obtained by performing a horizontal flip on the first endpoint image 502. This also makes pixel values of pixels in the second endpoint image 505 different from pixel values of corresponding pixels in the original image.

The reason of changing the resolution is based on the following considerations:

Generally speaking, image resolution refers to the number of pixels. For example, resolution of 480*800 refers to 480 horizontal pixels and 800 vertical pixels.

Assuming that resolution of the first endpoint image is 480*800, resolution of the original image is also 480*800. If resolution of the second endpoint image is changed to be different from 480*800, for example, changed to 800*480, pixel-by-pixel subtraction between the original image and the second endpoint image cannot be performed, thereby increasing the difficulty of cracking.

In addition, a partial or entire area of the first endpoint image may be processed by using the image processing manner.

Figure 5D:
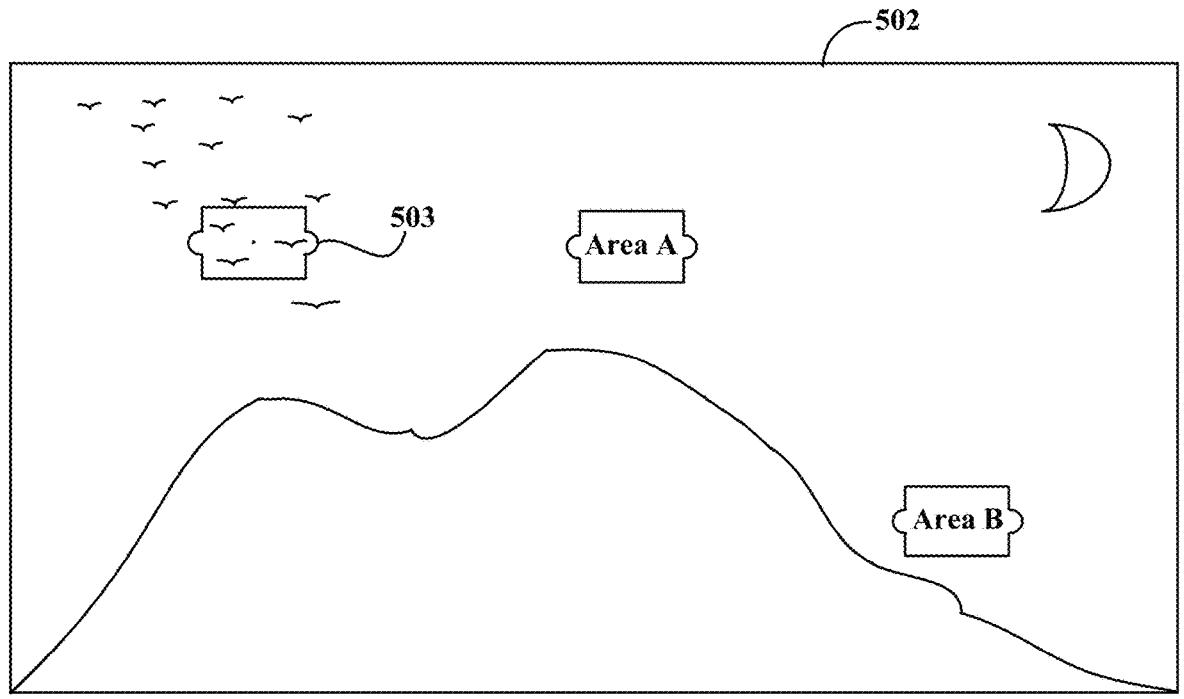
FIG. 5d is a schematic diagram of processing an area other than a slider placement area in a first endpoint image according to an embodiment of the present disclosure.
Figure 5E:
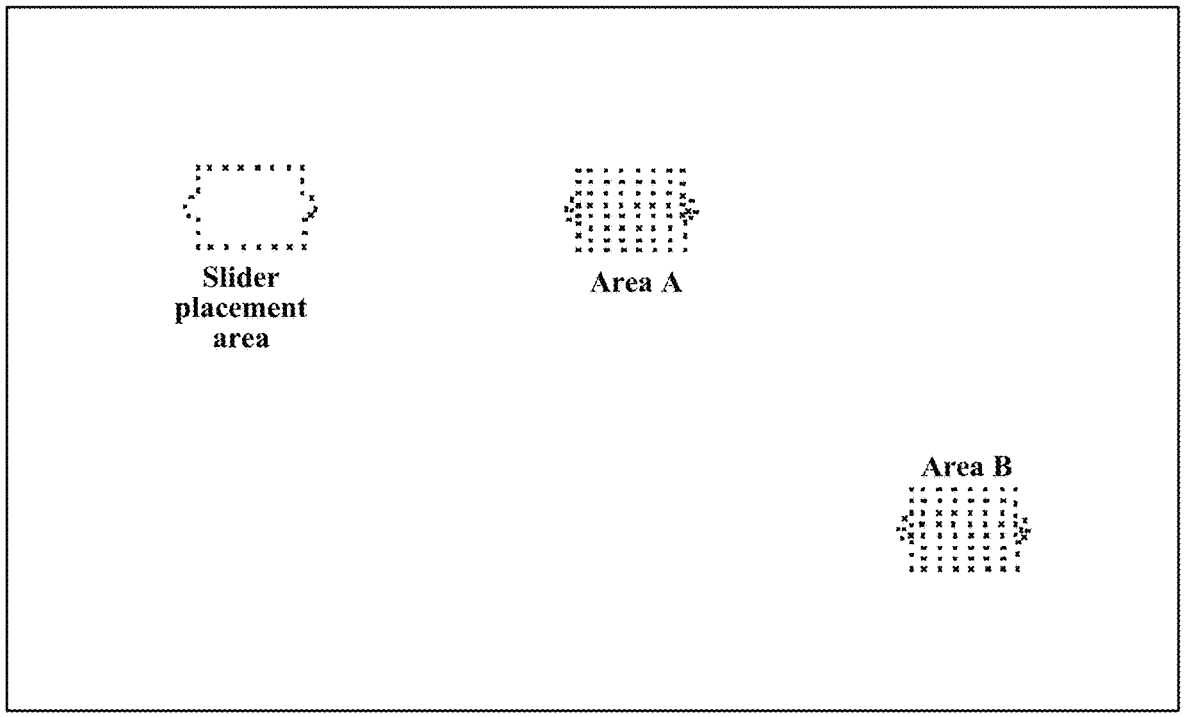
FIG. 5e is a schematic diagram of a result of subtraction between an original image and a second endpoint image according to an embodiment of the present disclosure.

Referring to FIG. 5d, a partial area is used as an example. The second endpoint image may be obtained by processing an area A and an area B other than the slider placement area 503 in the first endpoint image in the image processing manner. Refer to FIG. 5e for a result of subtraction between the original image and the second endpoint image. As can be seen, in addition to the slider placement area 503, pixel values of the area A and the area B also are not zero, thereby increasing the difficulty of cracking.

The image processing may be performed on the slider or not.

Part 404: The server returns a sliding verification code to the client/terminal (the browser).

The sliding verification code may include the slider and the second endpoint image, or may include the original image, the slider and the second endpoint image.

In a case that the sliding verification code includes the original image, the slider and the second endpoint image, the server may return the three images at a time, or return the three images in two stages: first return the original image and then return the slider and the second endpoint image.

Part 405: The client/terminal (the browser) presents the received sliding verification code.

In the case that the sliding verification code includes the slider and the second endpoint image and does not include the original image, the client/terminal (the browser) may directly present the slider and the second endpoint image.

In the case that the sliding verification code includes the original image, the slider and the second endpoint image, the client/terminal (the browser) may present the three blocks in two stages: first present the original image and then present the slider and the second endpoint image. This will be described below in the present disclosure.

Part 406: The client/terminal (the browser) monitors an operation of an input device to acquire verification information.

The input device is usually a mouse or a keyboard.

The user may drag the slider with the input device such as the mouse and the keyboard on the client. The client/terminal (the browser) may monitor the input device such as the mouse and the keyboard.

Take the mouse as example, after detecting a mouse release event, the client/terminal (the browser) may acquire a location at which the slider is to be placed, that is, an endpoint location (also referred to as a second endpoint location). The endpoint location may be represented by a coordinate of the center point of the slider on the second endpoint image presented on the client.

In an example, the verification information at least includes an endpoint location at which the slider is to be placed by the user.

In addition, in other examples, the verification information may further include a sliding trajectory generated by the user dragging the slider. The server may subsequently compare the sliding trajectory with massive samples to determine whether the user is a machine and human.

Part 407: The client/terminal (the browser) receives a submission instruction inputted by the input device and submits the verification information.

In practice, the user uses the input device such as the mouse and the keyboard to click a submit button to send the submission instruction.

Certainly, in some scenarios, the client/terminal (the browser) may directly submit the verification information after monitoring a mouse or keyboard release event.

Part 408: The server receives the verification information, and performs verification based on the verification information.

In an example, if the verification information includes only the second endpoint location, the server may compare the second endpoint location with a correct first endpoint location.

In another example, if the verification information further includes the sliding trajectory, the server may further compare the sliding trajectory with massive samples to determine whether the user is a machine and human.

Subsequently, if the verification succeeds, the server may send a notification indicating that the security verification is successful to the client/terminal (the browser).

If the verification fails, the server may send a verification failure notification.

Alternatively, the server may calculate the number of failures for the same sliding verification code; and if the number of failures reaches a threshold, send the verification failure notification.

Certainly, in others embodiment, when the current verification fails or the number of failures reaches a threshold, the server may acquire a new sliding verification code and send the new sliding verification code to the client/terminal.

As can be seen, in the embodiments of the present disclosure, the first endpoint image and the slider are generated from the same original image, and the slider and the second endpoint image included in the sliding verification code are returned to the verification requester finally. The second endpoint image is obtained by performing image processing on the first endpoint image, and after the image processing, pixel values of pixels in the second endpoint image are different from pixel values of corresponding pixels in the original image. In this way, even if pixel-by-pixel subtraction is performed between the original image and the second endpoint image, not all pixel values of other areas other than the slider placement area are zero after the subtraction, thereby increasing the difficulty of cracking the sliding verification code and improving security.

The filter processing manner is mentioned above. Filter is a special image effect processing technology, and utilizes a particular program algorithm to calculate and transform the color, brightness, saturation ratio, contrast ratio, hue, distribution, arrangement and other attributes of pixels in an image, to generate a special visual effect of the image.

The following embodiments are described focusing on filter processing.

Figure 6:
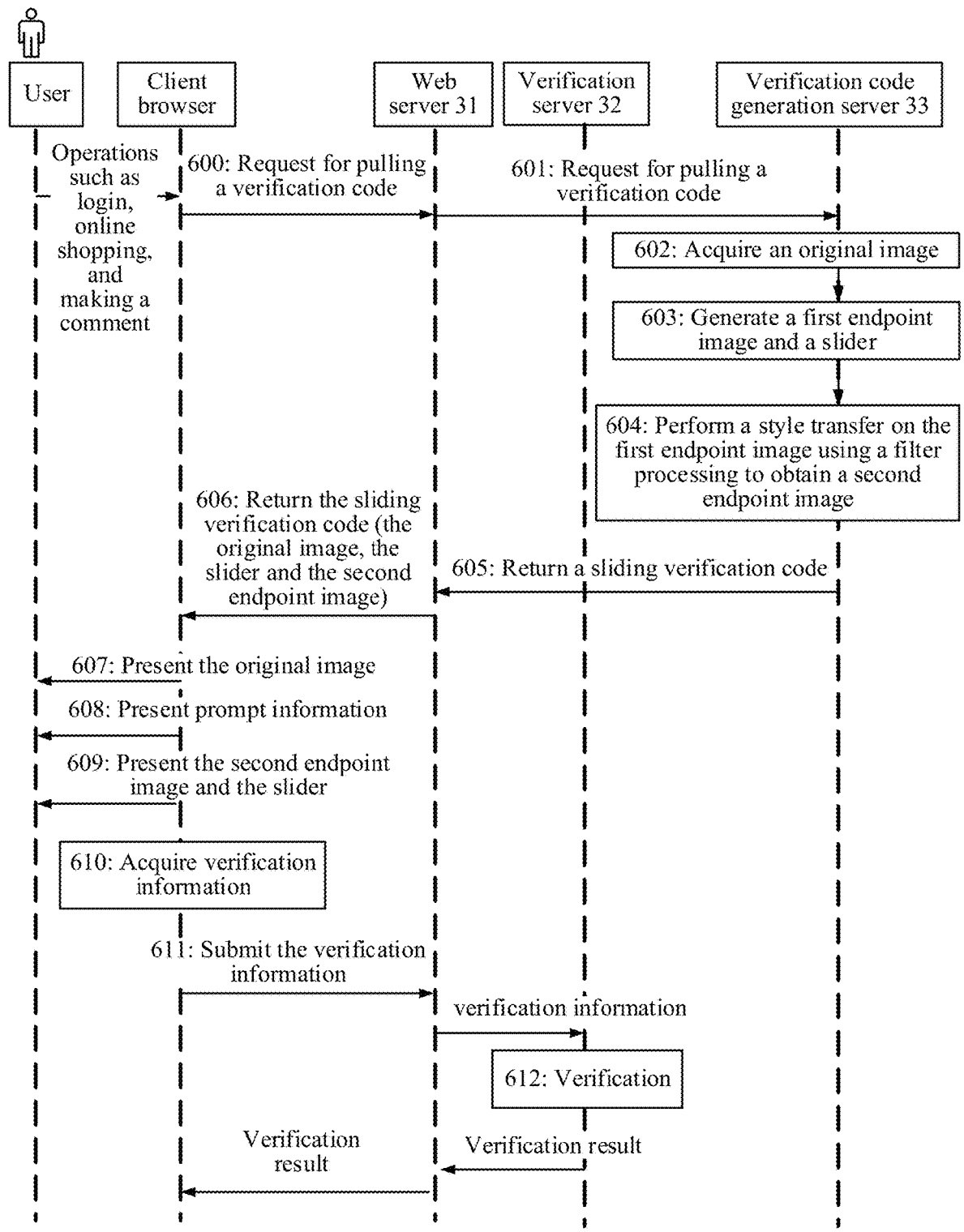

Referring to FIG. 6, FIG. 6 uses the servers in the security verification system shown in FIG. 3a as an example to describe in detail an interaction process between the servers end and the client during verification.

Part 600: The client/terminal (the browser) sends a request for pulling a verification code to the web server 31.

Part 600 is similar to Part 400, and the details are not described herein again.

Part 601: After receiving the pulling request, the web server 31 forwards the pulling request to the verification code generation server 33.

In an example, the web server 31 may forward the pulling request to the verification code generation server 33 through the verification server 32, or may directly forward the pulling request to the verification code generation server 33.

Specifically, the first communication unit 302 of the second security verification device may be deployed on the web server 31 to receive the pulling request and forward the pulling request to the verification code generation server 33.

The first acquiring unit 301 of the second security verification device may be deployed on the web server 31, or may be deployed on the verification code generation server 33.

When the first acquiring unit 301 is deployed on the web server 31, the "acquiring a sliding verification code" may refer to receiving a sliding verification code returned by the verification code generation server 33.

When the first acquiring unit 301 is deployed on the verification code generation server 33, the "acquiring a sliding verification code" may include an operation of generating a sliding verification code.

Part 602: The verification code generation server 33 acquires an original image used for generating a sliding verification code.

Part 602 is similar to Part 401, and the details are not described herein again.

Part 603: The verification code generation server 33 generates a first endpoint image and a slider by using the original image.

Part 603 is similar to Part 402, and the details are not described herein again.

The verification code generation server 33 may further include a sliding verification code unit and a transfer unit.

Parts 602 to 603 may be specifically completed by the sliding verification code unit, and the transfer unit may be configured to implement the following Part 604.

In an example, the sliding verification code unit and the transfer unit may also serve as constituents of the second security verification device.

Part 604: The verification code generation server 33 performs a style transfer on the first endpoint image in a filter processing manner to obtain a second endpoint image.

Different filters may be used to achieve different style transfers, to achieve visual effects such as relief sculpture, blur, dynamic blur, radial blur, and the like.

In addition, the filter may also be used to change the artistic style of an image. For example, the image may have visual effects such as oil painting, watercolor painting, pencil painting, chalk painting, gouache painting, and the like.

Certainly, the filter may also be used to transfer the style of an image into a painting style of an artist (such as Van Gogh, Monet, and Picasso).

Figure 7A:
FIG. 7a is a schematic diagram of a first endpoint image according to an embodiment of the present disclosure.
Figure 7B:
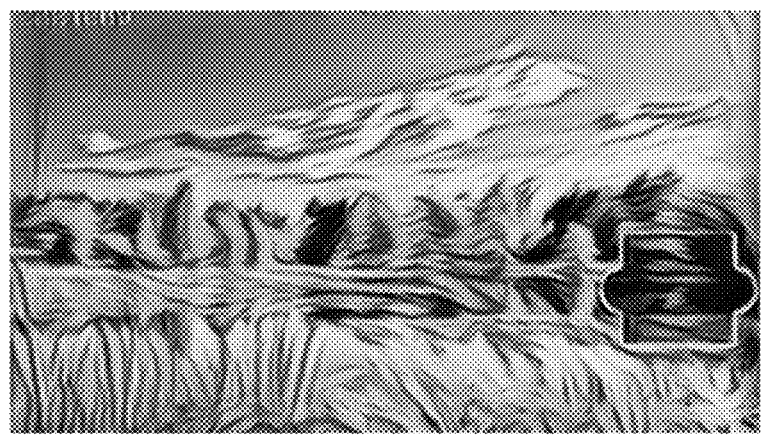
FIG. 7b and FIG. 7c are schematic diagrams of a second endpoint image according to an embodiment of the present disclosure.
Figure 7C:

For example, referring to FIG. 7a, assuming that the first endpoint image is as shown in FIG. 7a, the filter may be used to transfer the style of the first endpoint image into a style shown in FIG. 7b or FIG. 7c.

As can be seen, if the filter processing is used properly, not only the anti-cracking rate of the verification code can be increased, but also the aesthetics can be ensured.

Refer to Part 403 of the foregoing embodiment for other relevant descriptions, and the details are not described herein again.

In an example, a filter model may be used to perform the filter processing on the first endpoint image to obtain the second endpoint image.

The filter model may be obtained through training by the transfer unit, and the specific method for training the filter model will be introduced later.

Part 605: The verification code generation server 33 returns the sliding verification code to the web server 31.

Specifically, the sliding verification code may be returned to the web server 31 by the transfer unit.

In this embodiment, the sliding verification code includes the original image, the slider and the second endpoint image.

In an example, the verification code generation server 33 may return the sliding verification code to the web server 31 through the verification server 32. The verification server 32 records the location of the center point, that is, a slider endpoint (also referred to as a first endpoint location) of the slider placement area in the second endpoint image at the same time, for subsequent verification.

In another example, the verification code generation server 33 may return the sliding verification code directly to the web server 31, and meanwhile, the verification code generation server 32 may notify the verification server 32 of the first endpoint location.

Part 606: After receiving the sliding verification code, the web server 31 returns the sliding verification code to the client/terminal (the browser).

Specifically, the sliding verification code may be returned by the first communication unit 302, and may be received by the second communication unit 303 of the client.

Part 606 is similar to Part 404, and the details are not described herein again.

Part 607: The client/terminal (the browser) presents the original image in sliding verification code.

In this case, a verification image begins to appear from the perspective of the user.

Part 608: The client/terminal (the browser) presents prompt information for instructing the user to slide the slider to a specified location to complete the verification. In this process, the client/terminal (the browser) continuously monitors an operation of the input device.

More specifically, Part 607 and Part 608 may be completed by the presentation unit 304 of the first security verification device, and the second acquiring unit 305 monitors the input device.

Part 609: When detecting that the focus is on the original image, the client/terminal (the browser) presents the second endpoint image and the slider in the sliding verification code.

Take the mouse as example, after the user places the mouse on the original image, the background detects the operation and presents the second endpoint image and the slider to the user, and then, the user operates the mouse to drag the slider to complete the verification.

More specifically, the presentation unit 304 may be used to present the second endpoint image and the slider.

Part 610: The client/terminal (the browser) acquires verification information.

Take the mouse as example, after monitoring a mouse release event, the client/terminal (the browser) may acquire a location at which the slider is to be placed, that is, an endpoint location (also referred to as a second endpoint location). The endpoint location may be represented by a coordinate of the center point of the slider on the second endpoint image presented on the client.

In an example, the verification information at least includes an endpoint location at which the slider is to be placed by the user.

In addition, in other examples, the verification information may further include a sliding trajectory generated by the user dragging the slider. The server may subsequently compare the sliding trajectory with massive samples to determine whether the user is a machine and human.

Specifically, Part 610 may be executed by the second acquiring unit 305.

Part 611: The client/terminal (the browser) submits the verification information.

In an example, the client/terminal (the browser) may submit the verification information as triggered by a submission instruction. The user the input device such as the mouse and the keyboard to click a submit button to send the submission instruction.

Certainly, in some scenarios, the client/terminal (the browser) may directly submit the verification information after monitoring the mouse or keyboard release event.

More specifically, Part 611 may be completed by the second communication unit 303.

Part 612: The web server 31 transmits the received verification information to the verification server 32 for verification.

In an example, the verification information may be received by the first communication unit 302 and transmitted by the first communication unit 302 to the verification server 32.

In an example, if the verification information includes only the second endpoint location, the verification server 32 may determine whether the second endpoint location is consistent with a correct first endpoint location (where a certain error is allowed).

In another example, if the verification information further includes the sliding trajectory, the verification server 32 may further compare the sliding trajectory with massive samples to determine whether the user is a machine and human.

Subsequently, if the verification succeeds, the verification server 32 may send a notification indicating that security verification is successful to the client/terminal (the browser) through the web server 31.

If the verification fails, the verification server 32 may send a verification failure notification through the web server 31.

Alternatively, the verification server 32 may calculate the number of failures for the same sliding verification code; and if the number of failures reaches a threshold, send the verification failure notification through the web server 31.

Certainly, in other embodiments, when the current verification fails or the number of failures reaches a threshold, the verification server 32 may instruct the web server 31 to acquire a new sliding verification code and send the new sliding verification code to the client/terminal.

Assuming that a user wants to make a comment on news of a portal website, the portal website requires the user to pass the verification of the sliding verification code before making a comment, in order to prevent malicious spamming and other purposes.

Figure 8:
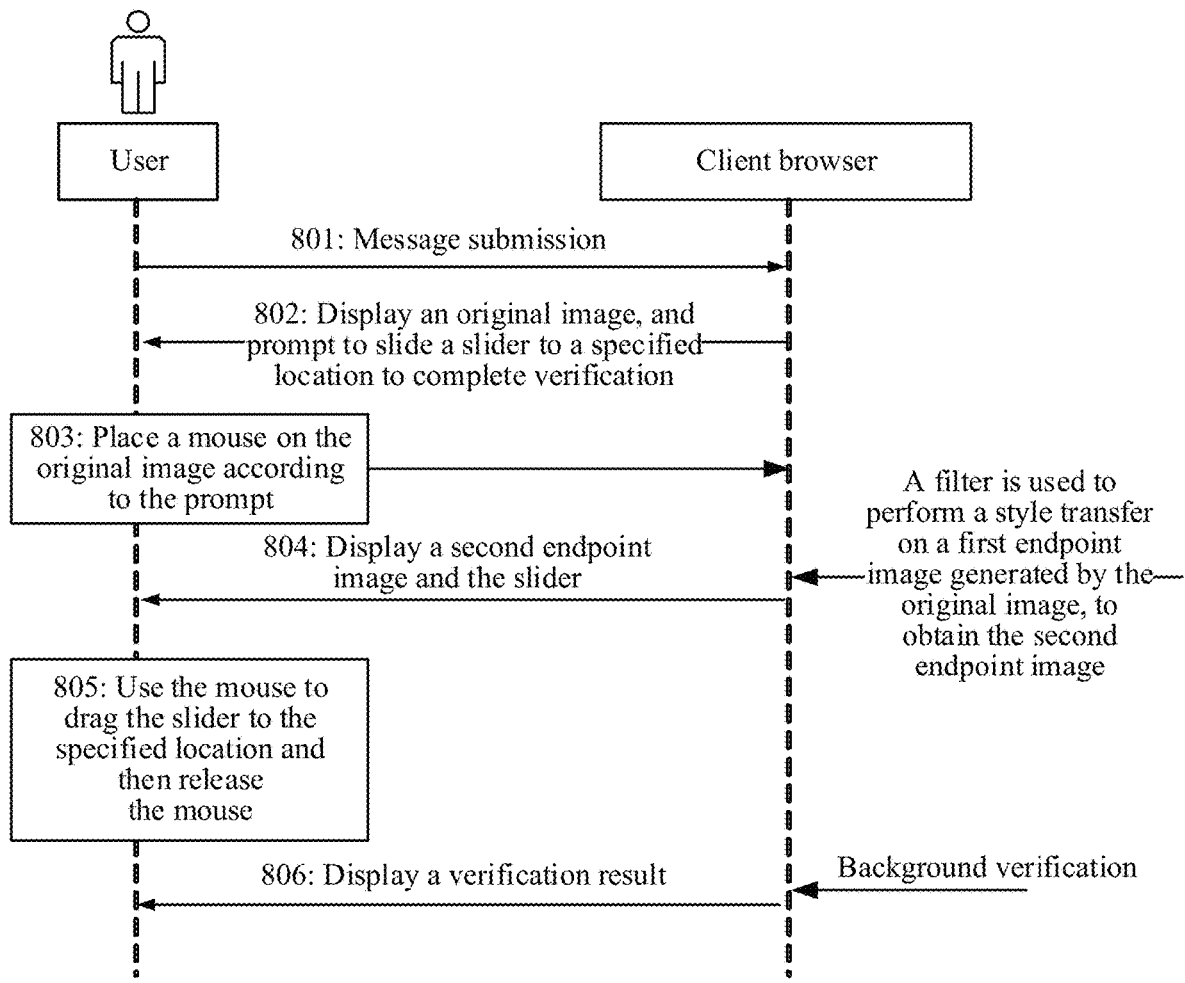
FIG. 8 is an exemplary flowchart of a security verification method from the perspective of a user according to an embodiment of the present disclosure.

Referring to FIG. 8, from the perspective of a user, the procedure and operations involved are as follows:

Step 801: The user clicks a "Submit Message" button.

Step 802: A browser displays an original image, and provides a prompt for instructing the user to slide a slider to a specified location to complete verification.

Step 803: The user places a mouse on the original image according to the prompt.

Step 804: The browser displays a second endpoint image and the slider.

Certainly, in the background which is invisible to the user, a filter is used to perform a style transfer on a first endpoint image generated from the original image, to obtain the second endpoint image.

Step 805: The user uses the mouse to drag the slider to the specified location and then releases the mouse.

Step 806: The browser displays a verification result.

If the verification succeeds, the submission of the message of the user will succeed correspondingly.

As can be seen, in the embodiments of the present disclosure, the filter is used to perform a style transfer on the first endpoint image to obtain the second endpoint image, thereby obtaining a sliding verification code including the second endpoint image and the slider. After the style transfer, pixel values of pixels in the second endpoint image are different from pixel values of corresponding pixels in the original image. In this way, even if pixel-by-pixel subtraction is performed between the original image and the second endpoint image, not all pixel values of other areas other than the slider placement area are zero after the subtraction. In addition, after the style transfer, the contour of the slider placement area becomes more difficult to recognize and crack, thereby increasing the difficulty of cracking the sliding verification code and improving security. Also, the aesthetics is ensured and user experience is improved.

Finally, how to train the filter model is described below.

In an example, the filter model may be trained based on given reference images.

Specifically, a deep neural network may be trained based on the given reference images, and the trained deep neural network may be used as the filter model.

Due to the strong aesthetics of artistic styles, an artistic style image may be given, and the deep neural network is trained to perform a style transfer on an input image, so as to generate an image having an artistic style of the artistic style image.

Figure 9A:
FIG. 9a is a schematic diagram of a first endpoint image according to an embodiment of the present disclosure.
Figure 9B:
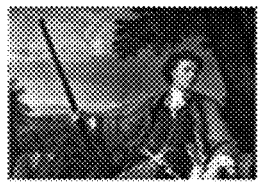
FIG. 9b is a schematic diagram of a given artistic style image according to an embodiment of the present disclosure.
Figure 9C:
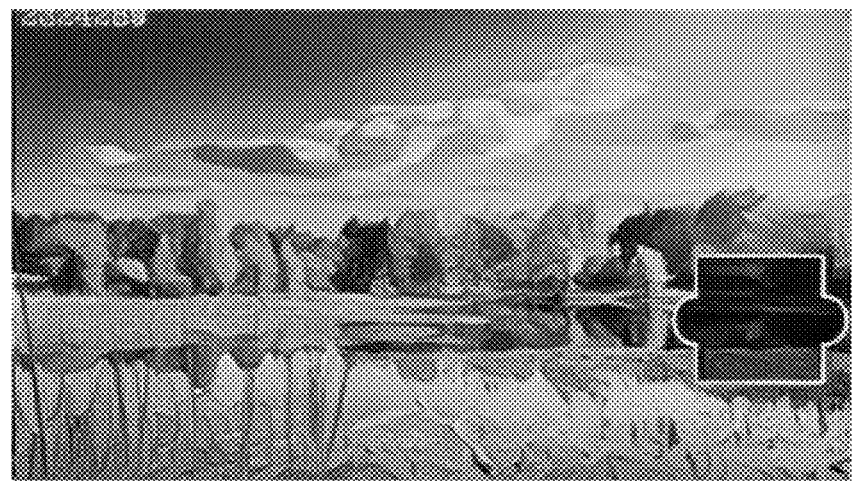
FIG. 9c is a schematic diagram of a second endpoint image according to an embodiment of the present disclosure.

For example, assuming that the first endpoint image is as shown in FIG. 9a and the given artistic style image is as shown in FIG. 9b, the generated second endpoint image may be as shown in FIG. 9c. The content of the second endpoint image is as similar as possible to the first endpoint image (or the original image), and the artistic style of the second endpoint image is similar to the given artistic style image.

Figure 10:
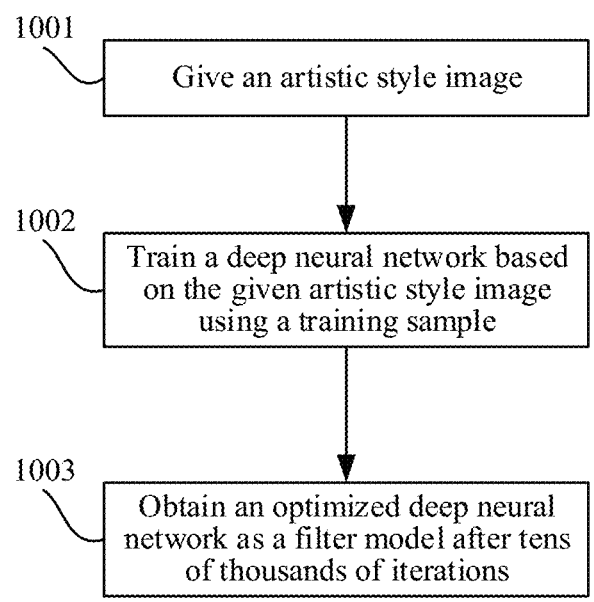
FIG. 10 is a flowchart of training according to an embodiment of the present disclosure.

Referring to FIG. 10, specific implementation steps of the training process are described below.

Part 1001: An artistic style image (for example, the artistic style image shown in FIG. 9b) is given.

In a specific implementation, the artistic style image may be manually specified (or inputted) or automatically selected from an art gallery.

Part 1002: A deep neural network is trained by using training samples based on the given artistic style image.

In an example, more than 100,000 images provided in a COCO database (Common Objects in Context, a deep learning dataset provided by Microsoft) may be used as training samples and inputted to the deep neural network. The deep neural network is trained according to a loss function of the deep neural network to obtain an optimized deep neural network.

An architecture of the deep neural network is usually formed by stacking a plurality of layers of simple modules, and the multilayer architecture may be trained using a stochastic gradient descent method.

Two loss functions of the deep neural network, that is, a style loss function and a content loss function, may be optimized constantly through the training using the stochastic gradient descent method.

A smaller value of the style loss function indicates that the artistic style of the image after the transfer is more similar to the artistic style of the given artistic style image. A smaller value of the content loss function indicates that content of the image after the transfer is more similar to the inputted training sample.

The value of the style loss function may be obtained by calculating a two-norm between the image after the transfer and a deep feature map of the artistic style image.

The value of the content loss function may be obtained by calculating a two-norm between the image after the transfer and the original image.

The deep feature map is in a matrix form.

The two-norm is two norms of matrix A, that is, a square root value of a maximum characteristic root of a product of a transpose matrix of A and the matrix A, which is a linear distance between two vector matrices in space. This is similar to calculating a linear distance between two points on a chessboard.

Part 1003: An optimized deep neural network may be obtained as a filter model after tens of thousands of iterations.

For example, if the first endpoint image is input to the trained deep neural network, an image having the artistic style shown in FIG. 9b may be obtained.

Certainly, a plurality of different artistic style images may be given, and the deep neural network is trained according to the foregoing steps respectively to obtain a plurality of filter models, so that diversified second endpoint images having different styles may be obtained.

Certainly, other constraints may further be defined for the artistic style transfer. For example, the image after the style transfer should not affect the user visual experience, and the slider placement area is recognizable by human eyes (that is, may be recognized by humans or artificial intelligence). In addition, the image after the style transfer needs to effectively resist cracking attacks which adopt subtraction between two images.

Therefore, in other embodiments of the present disclosure, the plurality of trained filter models (each filter model corresponds to one filter processing manner) may further be screened to select an artistic style processing manner that is the most difficult to crack.

For example, there are a total of 100 filter processing manners obtained through training, from which N filter processing manners (where N is a positive integer) that are the most difficult to crack may be selected and used to process the first endpoint image. That is, the filter processing manners (also referred to as optimal filter processing manners) for the filter processing of the first endpoint image are the N filter processing manners that are the most difficult to crack and that are selected from a plurality of filter processing manners.

More specifically, the N filter processing manners that are the most difficult to crack may be selected by using the following method:

calculating a cracking rate of each filter processing manner; and selecting N filter processing manners having the lowest cracking rates as the optimal filter processing manners.

A method of calculating the cracking rate is described as follows:

For any one of the filter processing manners, process the first endpoint images amount to m by using a filter model corresponding to the filter processing manner to obtain m second endpoint images;

Attempt to crack the m second endpoint images by using a cracking method of "pixel-by-pixel subtraction between two images";

Count the quantity n of cracked second endpoint images; and

Use n/m as a cracking rate of the filter processing manner.

In addition, in other embodiments of the present disclosure, the filter processing manner may be selected from the plurality of filter processing manners based on a user preference. For example, if the user likes Van Gogh, and if a filter processing manner with the Van Gogh style is the most difficult to crack among the filter processing manners, the filter processing manner with this style may be selected as the optimal filter processing manner.

In addition, the embodiments of the present disclosure further provide a storage medium configured to store program code, the program code being configured to perform the security verification method according to the foregoing embodiments.

The embodiments of the present disclosure further provide a computer program product including an instruction, the computer program product, when run on a server or a terminal, causing the server or the terminal to perform the security verification method according to the foregoing embodiments.

The embodiments of the specification are described in a progressive manner. Each embodiment focuses on a difference from other embodiments. For same or similar parts in the embodiments, refer to these embodiments. The device disclosed in the embodiments corresponds to the method disclosed in the embodiments and therefore is briefly described. For related parts, refer to the description of the method.

A person skilled in the art may further realize that units and algorithm steps of each example described in combination with the embodiments herein can be implemented through electronic hardware, computer software, or a combination thereof. In order to clearly describe the interchangeability between hardware and software, the compositions and steps of the examples have been generally described according to functions in the foregoing descriptions. Whether to implement the functions through hardware or software depends on particular applications and design constraints of the technical solutions. A person skilled in the art may use a different method to implement the described functions for each particular application, but such an implementation shall not be considered as going beyond the scope of this application.

In combination with the embodiments disclosed in this specification, method or algorithm steps may be implemented directly through hardware, a software unit executed by a processor, or a combination thereof. The software unit may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

The foregoing descriptions of the disclosed embodiments enable a person skilled in the art to implement or use this application. Various modifications to the embodiments are apparent to a person skilled in the art, and the generic principles defined herein may be implemented in other embodiments without departing from the spirit or scope of this application. Therefore, this application is not intended to be limited to the embodiments described herein but is to be accorded the broadest scope consistent with the principles and novel features disclosed herein.

What is claimed is:

1. A security verification method performed by a server, the method comprising:
    receiving, from a client, a request for security verification;
    acquiring a slider and a second endpoint image, the second endpoint image being obtained by performing image processing on a first endpoint image, both the first endpoint image and the slider being generated from a same original image; and
    sending the slider and the second endpoint image to the client for the client to display the slider and the second endpoint image for the security verification, wherein neither the original image nor a graphical representation of the original image is displayed on the client for the security verification.

2. The method according to claim 1, wherein the performing the image processing on the first endpoint image comprises changing a distribution of pixel values of the first endpoint image to obtain the second endpoint image.

3. The method according to claim 2, wherein the image processing comprises an addition of random noise, a filter processing, a horizontal flip, or a change of resolution.

4. The method according to claim 2, wherein the distribution of pixel values outside a slider placement area in the first endpoint image is changed.

5. The method according to claim 1, wherein after the sending the slider and the second endpoint image, the method further comprises:
    receiving a verification information returned by the client; and
    performing verification based on the verification information.

6. The method according to claim 1, wherein the acquiring the slider and the second endpoint image comprises:
    acquiring an original image;
    generating the first endpoint image and the slider using the original image; and
    performing a filter processing on the first endpoint image to obtain the second endpoint image.

7. The method according to claim 6, wherein the filter processing is used to perform a style transfer on the first endpoint image.

8. The method according to claim 7, wherein the second endpoint image is obtained by performing the filter processing on the first endpoint image using a filter model; and the filter model is obtained through a training based on given reference images.

9. The method according to claim 6, wherein
    the filter processing comprises: first N filter processing manners with a lowest cracking rates selected from a plurality of filter processing manners, N being a positive integer; or
    a filter processing manner determined based on a user preference.

10. The method according to claim 6, wherein the performing the filter processing on the first endpoint image comprises:
    performing filter processing on a partial or entire area of the first endpoint image.

11. A security verification method performed by a client, the method comprising:
    sending a request for security verification to a server;
    receiving a slider and a second endpoint image, the second endpoint image being obtained by performing image processing on a first endpoint image, both the first endpoint image and the slider being generated from a same original image; and
    displaying the slider and the second endpoint image for the security verification, wherein neither the original image nor a graphical representation of the original image is displayed for the security verification.

12. The method according to claim 11, wherein the image processing comprises an addition of random noise, a filter processing, a horizontal flip, or a change of resolution.

13. The method according to claim 11, wherein the first endpoint image is not displayed for the security verification.

14. The method according to claim 11, wherein the client is a browser.

15. The method according to claim 11, wherein after the displaying the slider and the second endpoint image, the method further comprises:
    acquiring verification information; and
    returning the verification information for a verifier to perform verification based on the verification information.

16. The method according to claim 15, wherein the verification information comprises an endpoint location at which the slider is placed by an user and a sliding trajectory generated by the user dragging the slider.

17. A security verification device, comprising:
   a memory operable to store program code; and
   a processor operable to read the program code and perform a plurality of operations including:
      receiving, from a client, a request for security verification;
      acquiring a slider and a second endpoint image, the second endpoint image being obtained by performing image processing on a first endpoint image, both the first endpoint image and the slider being generated from a same original image; and
      sending the slider and the second endpoint image to the client for the client to display the slider and the second endpoint image for the security verification, wherein neither the original image nor a graphical representation of the original image is displayed on the client for the security verification.

18. The device according to claim 17, wherein the processor is operable to perform the plurality of operations including:
   changing a distribution of pixel values of the first endpoint image to obtain the second endpoint image.

19. The device according to claim 17, wherein the processor is further operable to perform a plurality of operations including:
   receiving a verification information returned by the client; and
   performing verification based on the verification information.

20. The device according to claim 17, wherein the processor is operable to perform the plurality of operations including:
   acquiring an original image;
   generating the first endpoint image and the slider using the original image; and
   performing a filter processing on the first endpoint image to obtain the second endpoint image.

* * * * *